United States Patent [19]
Waitts

[11] Patent Number: 5,585,144
[45] Date of Patent: Dec. 17, 1996

[54] HOLOGRAM WITH INTEGRAL PRINTED INDICIA

[75] Inventor: Robert Waitts, Fairfield, N.J.

[73] Assignee: Crown Roll Leaf, Inc., Paterson, N.J.

[21] Appl. No.: 199,552

[22] Filed: Feb. 22, 1994

[51] Int. Cl.[6] .............................. B05D 5/06; B05D 1/36
[52] U.S. Cl. ........................ 427/258; 427/265; 427/271
[58] Field of Search ........................ 427/7, 147, 148, 427/162, 256, 258, 265, 275, 271; 359/2

[56] References Cited

U.S. PATENT DOCUMENTS

| | | | |
|---|---|---|---|
| 3,758,649 | 9/1973 | Frattarola | 264/1 |
| 3,922,416 | 11/1975 | Ryan | 428/172 |
| 5,044,707 | 9/1991 | Mallik | 359/2 |
| 5,083,850 | 1/1992 | Mallik et al. | 359/1 |
| 5,128,779 | 7/1992 | Mallik | 359/2 |
| 5,145,212 | 9/1992 | Mallik | 283/86 |
| 5,164,227 | 11/1992 | Miekka et al. | 427/162 |
| 5,310,222 | 5/1994 | Chatwin et al. | 283/86 |

*Primary Examiner*—Shrive Beck
*Assistant Examiner*—Fred J. Parker
*Attorney, Agent, or Firm*—Woodcock Washburn Kurtz Mackiewicz & Norris

[57] ABSTRACT

A material with holographic and non-holographic displayable indicia thereupon has an embossed holographic microtexture upon a surface thereof for forming a reflection hologram and resulting in an associated visible holographic pattern. A non-holographic pattern is primed with a priming press upon the embossed holographic microtexture at a predetermined orientation relative to the holographic pattern. The pattern may have several colors primed in registration and in registration with the holographic pattern which may include 2D and 3D indicia. A reflective coating overlies the microtexture and the primed pattern.

17 Claims, 2 Drawing Sheets

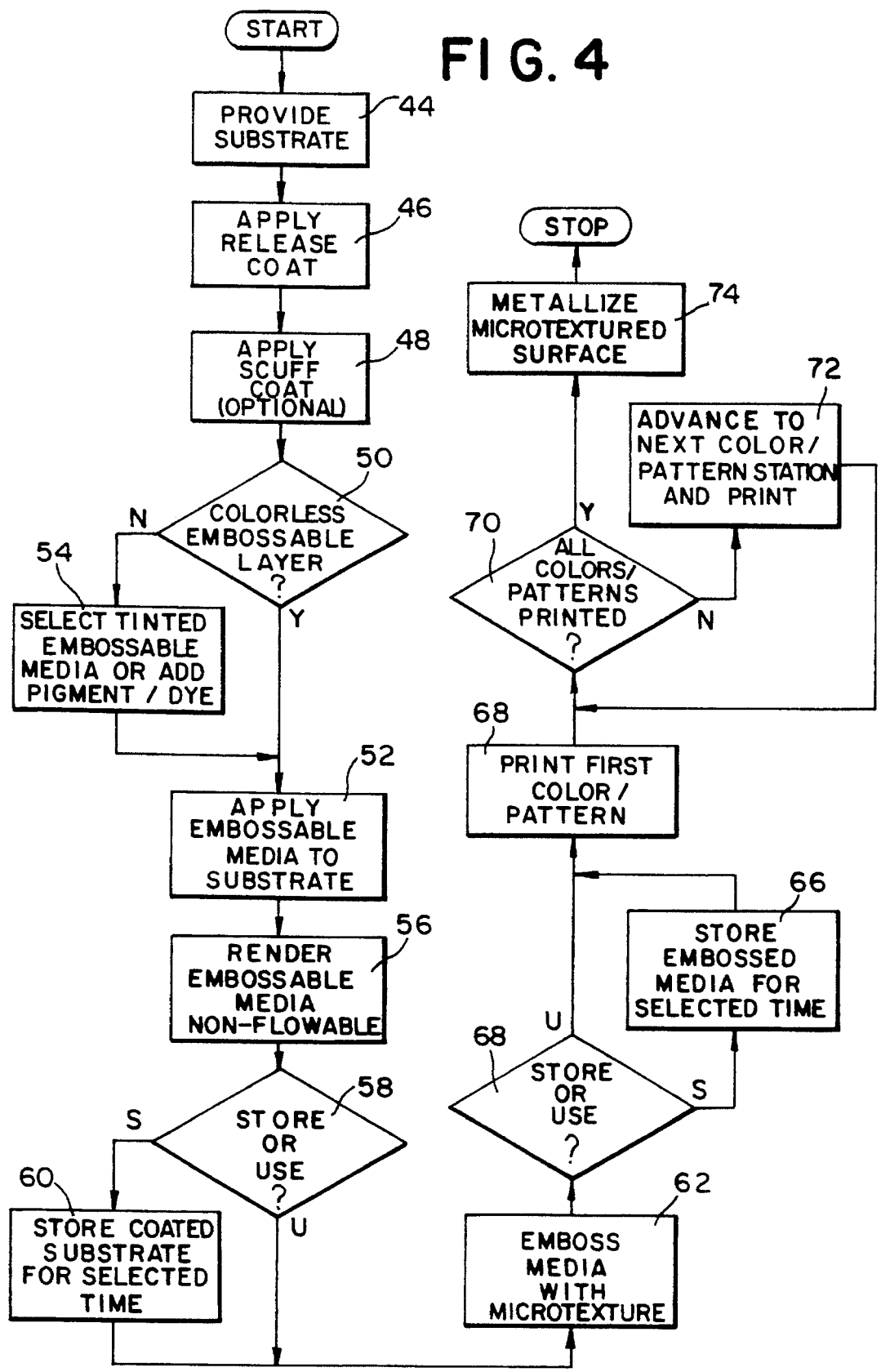

HOLOGRAM WITH INTEGRAL PRINTED INDICIA

FIELD OF THE INVENTION

The preset invention relates to holograms, diffraction gratings and the like, and more particularly to such displayable media associated with primed or other graphic indicia.

BACKGROUND OF THE INVENTION

Holograms and diffraction gratings have become very popular in recent years for their decorative effect. In addition, because holograms and diffraction gratings, hereinafter "holograms" are hard to produce or reproduce without sophisticated equipment and personnel, they have found wide application as a means for authenticating documents and other objects ranging from credit cards to limited edition collectibles. The popularity of holograms has been enhanced by economical, high-volume methods of producing them, such as the production of reflection holograms by embossing a web substrate to form a surface microcorrugation or microtexture representing an interference fringe pattern.

The various steps involved in the creation of holographic microtextured surfaces are well known and need not be described herein except to note that a few different methods for mass production exist, e.g., embossing, as exemplified by the patents to U.S. Pat. No. 3,758,649 to Frattarola, U.S. Pat. No. 3,922,416 to Ryan, and U.S. Pat. No. 5,164,227 to Miekka et al. An alternative novel embossing method is proposed in a copending U.S. patent application Ser. No. 07/998,832 filed Dec. 30, 1992 entitled METHOD OF PRODUCING SURFACE RELIEF HOLOGRAMS and assigned to the assignee herein.

In addition to embossing processes, casting techniques have also been proposed. For example, U.S. Pat. No. 5,083,850 to Mallik et al. discloses a casting process employing liquid resin casting of microtextured surfaces through photopolymerization.

In the course of their use as decoration and security devices, holograms are frequently employed in association with other traditional indicia, such as printing, photographs and handwriting. For example, a driver's license may bear an individual's photograph, signature, registration number and address, along with other information. For verification purposes, holographic indica, e.g., the state seal, may be incorporated into a license by laminating or gluing it thereto in a manner which prevents non-destructive alteration of the various elements of the card, i.e., to prevent forgery. This has given rise to various strategies for associating a hologram, which is hard to produce or reproduce without sophisticated and expensive apparatus, with a document to be secured. It is advantageous if the hologram is non-removable from the entirety of the document to be protected. This raises a problem however, in that, if a hologram is overlain upon other indicia, the underlying indicia is obscured. Solutions to this problem have been proposed. For example, U.S. Pat. Nos. 5,044,707, 5,128,779 and 5,145,212 to Mallik describe discontinuous holograms which are partially transparent owing to a discontinuous reflective layer. Copending U.S. patent application Ser. No. 08/048,769 filed Apr. 16, 1993 entitled SEMI-TRANSPARENT LAYER FOR A PHASE HOLOGRAM and assigned to the assignee of the present application proposes yet another solution in the form of an embossed reflection hologram having a continuous, semi-transparent reflective layer. In both cases, a compromise is struck between the brightness of the hologram and the visibility of the underlying indica.

In U.S. Pat. No. 5,083,850, Mallik et al. propose a technique for coating a hardened surface relief created by a liquid casting process with a discontinuous graphical pattern of a clear or colored paint that eliminates the surface relief pattern in the regions so coated. Mallik '850 suggests that the paint can be applied in the form of printing, which is understood to mean words. Mallik '850 also recognizes that printing can be applied to a web of diffraction grating media on the side which is opposite to the casted microtexture. While Mallik '850 conceptually explores applying some form of graphical pattern to a diffraction grating, Mallik '850 fails to supply sufficient information to carry out this technique, e.g., by failing to specify the "paint" to be used and the exact means by which this "paint" is applied. In addition, Mallik '850 is applicable to techniques involving holograms cast from liquid photocurable resin.

As applied to embossed media, when an application requires printed indicia in combination with holographic indicia, a web of existing metallized holographic material is overprinted on the viewing side, opposite to the microtexture and metallization. This is typically performed by the end user who has purchased holographic material without any printing on it. Frequently, this occurs after the holographic material is applied to product packaging. It would be beneficial, therefore, if an end user could obtain a holographic web from the manufacturer which already incorporated any desired printing, as this would eliminate the relatively difficult step of printing upon packaging at the end user's location.

Accordingly, the present invention provides a specific method for applying non-holographic printed indicia to an embossed, rather than cast, reflection hologram. The process yields a mixed holographic/non-holographic media which is ready for use by an end user without any subsequent priming steps.

SUMMARY OF THE INVENTION

The problems and disadvantages associated with the conventional techniques and devices utilized to produce mixed holographic and non-holographic indicia on a common substrate are overcome by the present invention which includes a material having holographic and non-holographic displayable indicia thereupon. The material has a substrate with an embossed holographic microtexture upon a surface thereof resulting in an associated visible holographic pattern. A selected non-holographic pattern is printed upon the embossed holographic microtexture at a predetermined orientation relative to the holographic pattern. A reflective coating overlies the microtexture and the printed pattern.

In an associated method, an embossed holographic microtexture upon a surface of a substrate is printed upon in a selected pattern with a printing press. The microtexture and the pattern is then coated with a reflective coating.

BRIEF DESCRIPTION OF THE FIGURES

For a better understanding of the present invention, reference is made to the following detailed description of an exemplary embodiment considered in conjunction with the accompanying drawings, in which:

FIG. 4 is a flow chart illustrating the steps of a process performed in accordance with the present invention.

DETAILED DESCRIPTION OF THE FIGURES

Figure 1:
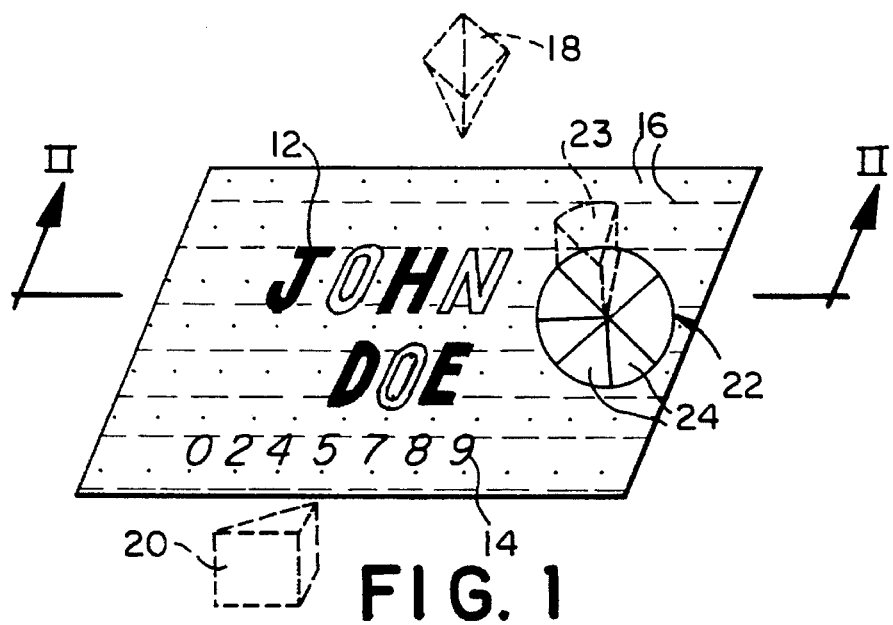
FIG. 1 is a perspective view of a card having holographic and non-holographic indicia formed in accordance with the present invention.

FIG. 1 shows a card 10, e.g., of a type similar to a common credit card, having four different kinds of viewable indicia thereon. The card includes printed, readable, indicia, i.e., in the form of readable letters 12 and numbers 14, a diffraction grating pattern 16 depicted as a pattern of dashes and dots and having a two dimensional or 2D effect, 3D holographic indicia represented by virtual solids 18 and 20 drawn in dashed lines, and a multicolored design 22 having variously colored segments 24. The printing 12 and 14 is at least partially non-holographic, may be monochromatic or variegated and is formed by a priming press as shall be explained below. The multicolored design 22 is also at least partially non-holographic and is printed by a printing press in different color inks as shall be described below. The virtual 3D images 18 and 20 are created by embossed reflection holograms. Similarly, the diffraction or rainbow grating pattern 16 is a reflection hologram impressed as a microtexture in an embossable surface. The diffraction grating pattern 16 can be continuous or discontinuous, uniform and repetitive, or it can be a reoriented composite such as that described in U.S. Pat. No. 5,158,845 entitled MULTICOLORED MATERIAL USING RAINBOW GRATING by the inventor herein and assigned to the assignee herein.

It should be observed that the diffraction grating pattern 16 has directionality and conveys a visual impression of being oriented in parallel with the periphery of the card 10. Similarly, the non-holographic indicia 12 and 14 have an observable orientation. In the case of the words "JOHN DOE", for example, they are in parallel orientation with respect to the diffraction pattern 16. In accordance with the present invention, any relative orientation is achievable. It is intended that the "O", "N" and "O" of the letters 12 of "JOHN DOE" are outlines through which the diffraction grating 16 may be viewed. Segments 24 of multicolored design 22 are printed in registration with each other, with a first segment of a first color abutting against a second segment of a second color. Segment 23 is a 3-D hologram, i.e., showing a wedge shaped object. The 3-D hologram 23 is in registration with the remainder of the multicolored design 22, i.e., the non-holographic segments 24 are printed in registration with the hologram segment 23. Thus, one can appreciate that the card 10 exhibits multicolored, non-holographic text and graphic designs printed in registration with each other. The non-holographic indicia is displayed simultaneously with both 2D and 3D holographic indicia with respect to which it has a predetermined orientation and is printed in registration thereto.

Figure 2:
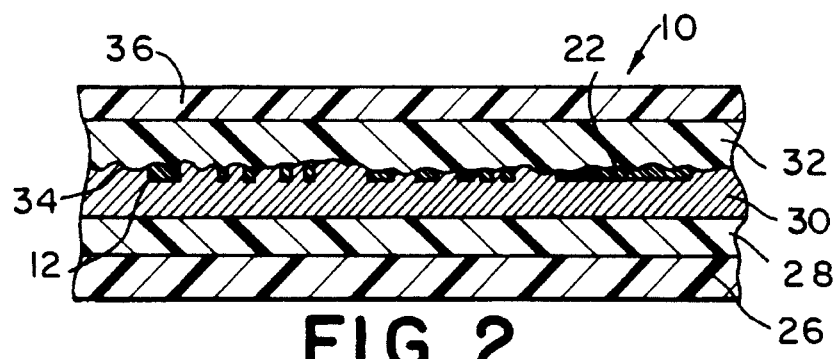
FIG. 2 is a cross-sectional view of the card depicted in FIG. 1 taken along section line II—II and looking in the direction of the arrows.

FIG. 2 shows the various layers making up the card 10 of FIG. 1. A base support 26, e.g., composed of PVC plastic provides a mechanical foundation for the card 10. An adhesive layer 28, e.g., of vinyl, bonds a hologram to the base support 26. The hologram has a metallized layer 30 deposited over an embossable layer 32 with a microtextured surface 34. Printed ink forming the letters 12 and design 22 is sandwiched between the metallized layer 30 and the microtextured surface 34 of the embossable layer 32. As will be recognized by one of normal skill in the art of holograms, the combination of a microtextured surface and a metallized layer composed, e.g., of a bright opaque metal like aluminum, can provide a reflection hologram exhibiting 2D or 3D effects. Other reflective coatings exist beside aluminum, such as high refractive index (HRI) coatings as exemplified by copending U.S. patent application Ser. No. 08/048,769 filed Sep. 16, 1993 assigned to the present assignee and incorporated herein for its teachings concerning the formation of reflective layers for phase holograms. A method for producing a material which simultaneous evidences both 2D and 3D effects is described and claimed in copending U.S. patent application Ser. No. 08/056,731 filed May 3, 1993 entitled TWO DIMENSIONAL GRAPHIC MATERIAL AND METHOD OF MAKING SAME and assigned to the present assignee, such application being incorporated by reference for its teachings thereon. A scuff coat 36 of e.g., acrylated urethane, has been deposited over the embossable layer to protect it from mechanical abrasion. Thus, one can appreciate that the present invention results in printed indicia which is protected from purposeful or inadvertent alteration by virtue of its inclusion within a laminate, i.e., between the metal layer 30 and the microtextured surface 34 of the embossable layer 32. The scuff coat 36 and the base support 26 provide further protection.

Figure 3:
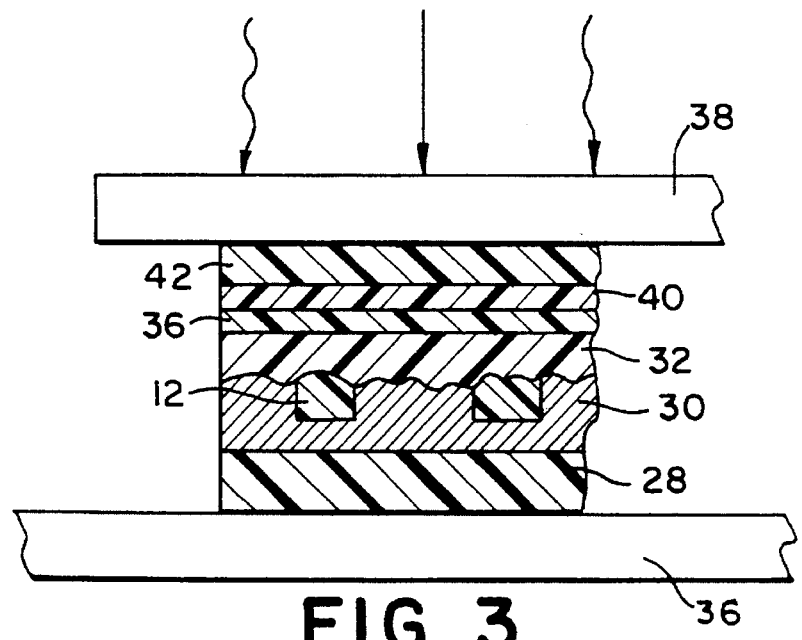
FIG. 3 is a cross-sectional view of the card of FIG. 1 at a final processing step.

FIG. 3 shows the laminate card depicted in FIGS. 1 and 2 at a preliminary state of completion. A heated press plate 38 is shown pressing down upon a laminate which includes the previously described layers, viz., base support 26, adhesive 28, metal 30, embossable layer 32, ink printing 12 and scuff coat 36. A release layer 40, e.g., of carnuba wax is shown which facilitates the separation of a carrier film 42 from the scuff coat 36 after the heat and pressure applied by press plate 38 has caused the adhesive layer 28 to adhere to the base support 26. As described in the assignee's co-pending U.S. patent application Ser. No. 07/998,832 filed Dec. 30, 1992 which is incorporated herein by reference, embossable media may be applied to a carrier film prior to embossing. FIG. 3 thus illustrates a precursor material which includes release coat 40 and a carrier film 42 for supporting the embossable coating layer 32 and a step in the process for adhering the holographic/non-holographic material to a base support to form a finished product.

FIG. 4 is a flow chart showing the steps involved in making a printed holographic product in accordance with the present invention and as shown in FIGS. 1, 2 and 3. At step 44, substrate (carrier film) is provided for the hologram. A typical substrate employed for this purpose is a web of polyester in roll form. The polyester web is coated 46 with a release coat, such as carnuba wax. The release coat assists in delaminating the finished hologram from the substrate web as described in relation to FIG. 3. A scuff coat may be applied at step 48 for those applications where the hologram is exposed to significant abrasion. A hologram may be formed in a layer of embossable media, typically by embossing with a roll die. An exemplary embossing process is described in the assignee's copending application Ser. No. 07/998,832 filed Dec. 30, 1992, which has already been incorporated herein by reference. As disclosed in that application, an embossable media may be applied to a substrate in flowable form and later embossed. Alternatively, a solid film or sheet of thermoplastic film may be embossed utilizing greater heat and/or pressure. It has been determined, however, that applying a flowable embossable media to a substrate web has certain unique advantages. One attribute of utilizing a separate embossable coating is the ability to independently determine the color of the embossable coating apart from the color of the substrate. Alternatively, the coating can be colorless. The selection of a color for the embossable coating provides a tint for the entire resulting hologram. The determination as to whether the embossable layer is to be colorless or tinted is made at step 50. If a tint is selected, a tinted embossable media is selected or a pigment or dye having that color is added to a clear embossable media 54.

The embossable media is thereafter applied to the substrate as a coating 52. In order to be embossable and to avoid sticking to the roll die, the media must be rendered non-flowable 56 by, e.g., cooling, drying or curing with actinic radiation. The coated substrate can then be stored 60, preferably in roll form, if desired 58, or fed directly into the embossing apparatus. In either case, the media coated upon the substrate is ultimately embossed 62 with a microtexture representing the interference fringe of a reflection hologram. After embossing, the embossed media can be stored 64, 66, e.g., either with the substrate or independently in roll form, pending ultimate final production steps as shall be described below.

Having created the microembossed media on a carrier web, the printed text, numbers or patterns can be applied thereto, preferably upon the microembossed surface 70. In accordance with the present invention, a common printing press is employed to apply printed text or designs to the embossed surface. For example, a six-color gravure printing press type HL-250 by D.C.M. Corporation may be used. Having printed a first pattern (text, numbers, graphics or any other) in a first color, the media is advanced to the next color/pattern printing station until the entire design is printed 72. The present invention preferably employs nitrocellulose/acrylic lacquer as the tintable embossable media and pigmented acrylic resin as printing ink. This combination results in printing with excellent fidelity and resolution of approximately 300 lines per inch. A printing throughput of about 300 feet per minute may be achieved in accordance with this invention. The particular printing ink employed must be compatible with the embossable media selected. A repulsion of the ink by the embossable media will frustrate ink transfer from the printing press and/or the undesired transfer to the substrate web upon storage in roll form. Either of these circumstances will result in degraded printed patterns in the final product. Similarly, the substrate-to-ink attraction should be less than that of the embossable media-to-ink attraction and, preferably, no transfer to the substrate occurs, even after storage in roll form for long periods of time.

Upon application of the ink to the microtextured surface, the microtexture is at least partially filled in and disabled as a source of diffraction resulting in a holographic image. At the same time, the ink pattern is readily visible through the embossable media. To complete the hologram with printed indicia, the embossed and printed media is metallized 74. If desired, an adhesive layer can be applied over the metal layer.

What has been described, therefore, is a process for printing a selected multi or single color design or pattern, which may include readable indicia, upon the embossed microtexture of a reflection hologram prior to metallization. This results in the printed indicia being contiguous with and intimately associated with holographic indicia which is difficult to replicate by a would-be forger. Besides its application for authenticating documents, the combination of printed and holographic indicia is economical to produce, thereby adding the capability to incorporate printed, non-holographic messages and patterns with holographic indicia for decorative or promotional purposes.

It should be understood that the embodiments described herein are merely exemplary and that a person skilled in the art may make many variations and modifications without departing from the spirit and scope of the invention as defined in the appended claims. All such variations and modifications are intended to be included within the scope of the invention as defined in the appended claims.

I claim:

1. A method for producing holographic and non-holographic displayable indicia upon a substrate comprising the steps of:
   (a) providing a substrate having an embossed holographic microtexture upon a surface thereof wherein the holographic microtexture has an orientation axis that defines an ability to view an image;
   (b) printing a selected non-holographic pattern upon said embossed holographic microtexture with a printing press, wherein said selected non-holographic pattern is printed at a predetermined angular orientation relative to said orientation axis of the holographic pattern;
   (c) applying a reflective coating to said embossed holographic microtexture and said selected non-holographic pattern;
   (d) applying a protective coating over the embossed holographic microtexture.

2. The method of claim 1, wherein said step of providing includes forming a substrate by applying an embossable coating to a carrier web and embossing said embossable coating with an embossing die.

3. The method of claim 1, wherein said reflective coating is a metal.

4. The method of claim 2, wherein said embossed holographic microtexture creates a visible holographic pattern.

5. The method of claim 4, wherein said selected pattern includes a plurality of colors printed in angular registration with one another.

6. The method of claim 4, wherein said holographic pattern includes areas thereof having a two dimensional visual effect.

7. The method of claim 4, wherein said holographic pattern includes areas thereof having a three dimensional visual effect.

8. The method of claim 4, wherein said selected non-holographic pattern is printed at a resolution of about 300 lines per inch.

9. The method of claim 4, wherein said step of printing is conducted at a rate of about 300 feet per minute.

10. The method of claim 2, wherein said embossable coating is a nitrocellulose acrylic lacquer.

11. The method of claim 10, wherein said selected non-holographic pattern is printed using pigmented acrylic resin.

12. The method of claim 2, wherein said selected non-holographic pattern includes readable matter.

13. The method of claim 2, wherein said selected non-holographic pattern includes graphics.

14. The method of claim 2, wherein said substrate provided is stored in rolls after embossing and prior to said step of printing.

15. The method of claim 2, wherein said embossable coating is tinted.

16. The method of claim 15, further including a step of tinting said embossable coating prior to said step of applying it to said carrier web.

17. The method of claim 2 wherein said reflective coating is partially transparent.

\* \* \* \* \*